Aug. 22, 1961 A. M. DOULGHERIDIS 2,997,397
METHOD OF AND MEANS FOR STERILIZING AND
PRESERVING FOODS AND OTHER MATERIALS
IN CONTAINERS
Filed Oct. 27, 1958 2 Sheets-Sheet 1
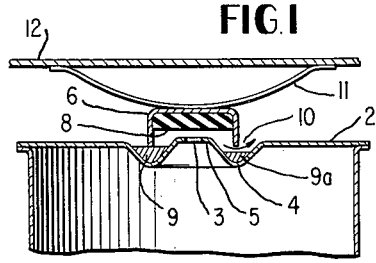
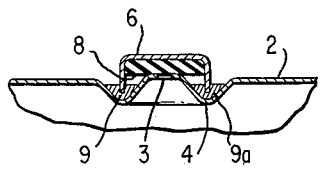
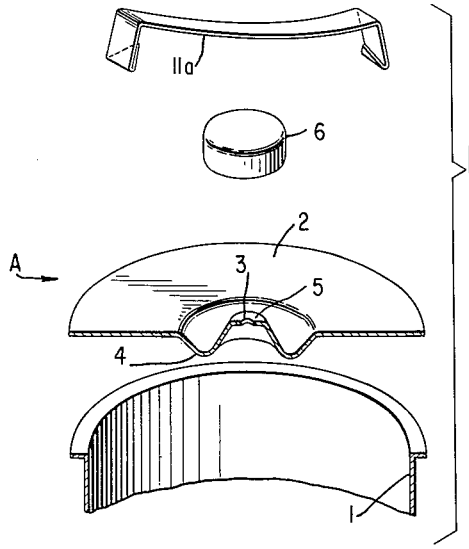
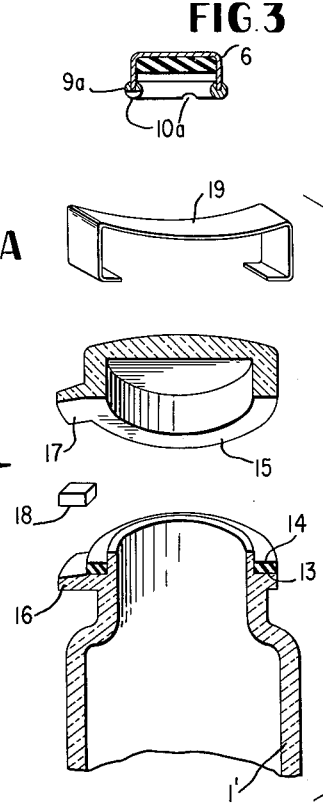
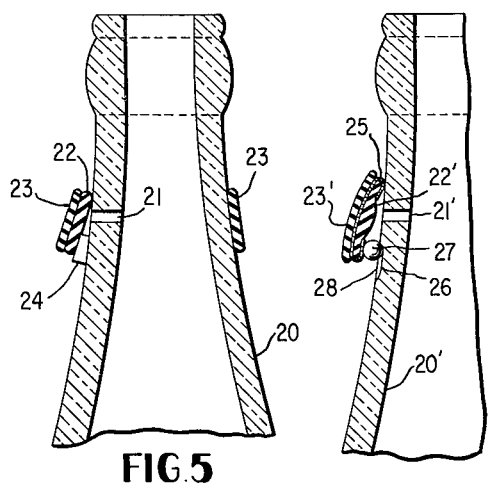
INVENTOR
ALCIBIADES M. DOULGHERIDIS

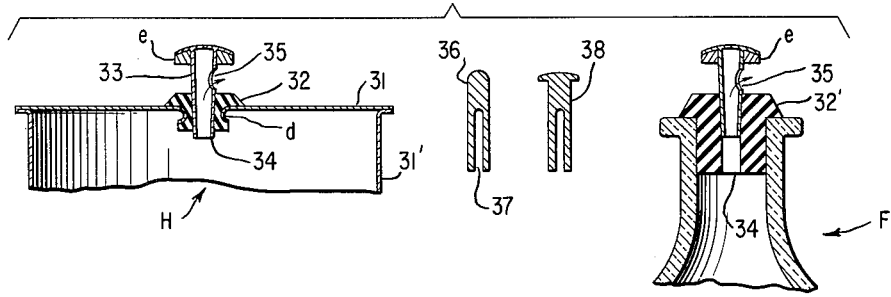
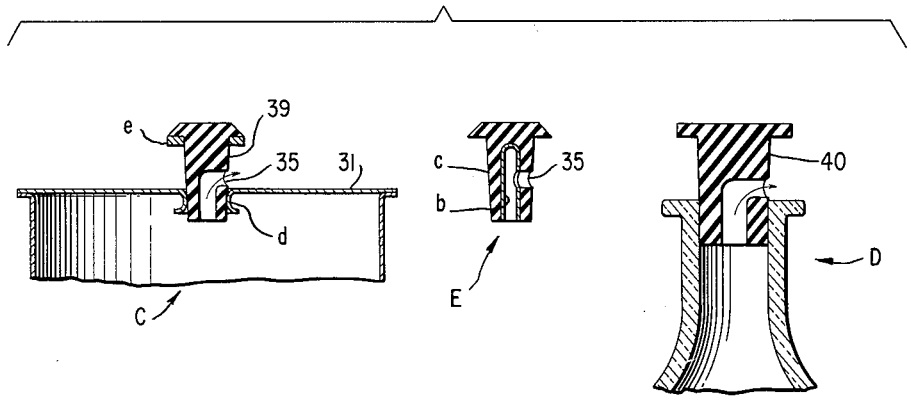
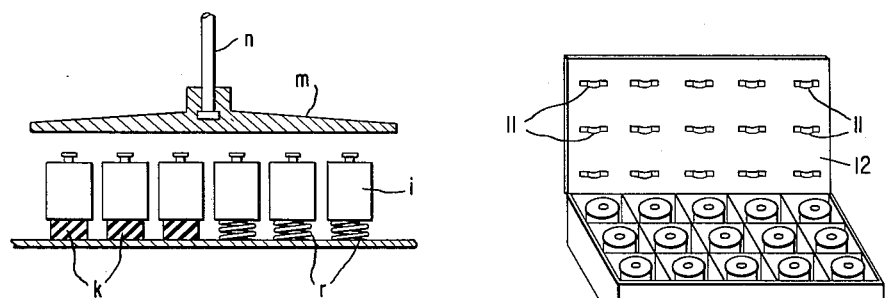
INVENTOR
ALCIBIADES M. DOULGHERIDIS

2,997,397
Patented Aug. 22, 1961

2,997,397
METHOD OF AND MEANS FOR STERILIZING AND PRESERVING FOODS AND OTHER MATERIALS IN CONTAINERS
Alcibiades Michael Doulgheridis, 39 Solomon St., Athens, Greece
Filed Oct. 27, 1958, Ser. No. 769,906
Claims priority, application Greece Apr. 12, 1958
19 Claims. (Cl. 99—182)

This invention relates to a method of preserving foods and other materials under sterile conditions to produce sterile products, and in systems for preserving or canning foods and other materials.

One of the objects of the invention is to provide a method, which will be highly efficient in that, before any preservation treatment of materials, particularly of foods, adequate time is used (usually 2–5 minutes, even more in certain cases) for completely removing, under very high vacuum conditions, air and other gases, even these diluted or enclosed inside the food product, or other material. The preliminary complete and integral exhaustion of air and gases result, particularly with respect to the preservation of foods, in a superior preservation, and in that particularly sterilization and/or cooking is achieved at lower temperatures, during a very much shorter time than in conventional or usual methods, in a very high and integral vacuum, and in the complete absence of free oxygen, in order to preserve the freshness and quality of the foods and, therefore, produce foods of superior appearance, consistency, flavor, odor and color, and in which the vitamin contents of the foods are almost entirely retained.

The above complete and integral exhaustion of the air and gases is not practically possible with the methods now employed, in which containers are seamed or sealed one at a time under vacuum or under a jet of steam. On the contrary with my method and systems therefor, numerous containers, placed in a closed space, may be simultaneously submitted to the above high and integral vacuumization.

Another object of the invention is to provide new and improved automatic systems for hermetically sealing containers filled with foods or other materials to be preserved, these systems including containers particularly adapted for automatic sealing in the closed space itself, after completion of the treatment for a predetermined time and temperature, in carrying out the improved method.

Moreover, very advantageously, the contents of the containers may be easily treated and sterilized without adding any juice or liquor (solid or dry pack) and without necessitating compact packing, since the sterilization steam enters the containers themselves and envelops immediately each piece of the contents to bring about perfect sterilization and/or cooking at a low temperature, in very short time and in complete absence of air and other gases, free oxygen included.

Another feature of the invention is to season and aromatize the contents of the containers by volatile and aromatic substances carried over by the steam into the containers.

Still another application of the invention is the ideal sterilization in high vacuum condition of container-packed bandages and other surgical or medical material, by steam introduced into the containers themselves, followed by automatic and hermetic sealing and soldering of the containers in the autoclave itself, thereby to ensure aseptic conditions of their contents for unlimited time.

According to the invention the improved method comprises the steps of subjecting the food or other substances to be preserved to a high vacuum condition at ordinary temperatures, or evacuation of relatively long duration, lasting at least long enough to withdraw substantially all of the air and other gas content of the food or other substance to be preserved. Where the food is processed in juice or a liquid, the evacuation will cause the air and gases diluted or enclosed in more or less small bubbles and bodies inside the food and liquid to be drawn out and removed. The processing of the food or other materials may be carried out in an autoclave of known type or other suitable hermetically closed space, and depending upon the particular product or the manner in which it is packed or to be packed in containers, the evacuation under high vacuum condition may extend for a period of from 2 to 5 minutes, even more in certain cases, as for example thick liquids or compact materials etc. This period may also depend upon the pumping equipment used for producing the vacuum and withdrawing the air.

Following the evacuation of the autoclave and essentially complete removal of the air and other gases from the food or other product, at ordinary room temperature, steam is advantageously introduced into the autoclave, from outside the autoclave, or the steam may be supplied by heating a body of water inside the autoclave to bring the temperature in the autoclave up to the desired degree depending on the particular food or other product being processed. For example in the case of sterilizing foods of the high acid group, such as the majority of fruits, tomatoes etc., and also of some other food products of low acidity (olives with or without brine, dry or semi-dry, figs and other products), when the temperature reaches about 78° to 95° C., according to the case, the steam is stopped, and where the food or other product is in containers of the type described in detail hereinafter, they are automatically sealed by a closure provided with a rubber sealing gasket, and thereafter the autoclave may be immediately opened and the filled and sealed containers removed.

Concerning foods of the medium acid and low acid groups, the sterilization is effected in about one-fourth to one-eighth of the time or even less of the time required by the conventional methods of sterilization, and at a temperature 5° to 8° C. lower or even more. However, even after the containers are hermetically closured the sterilizing and/or cooking of their contents may be continued inside the closed containers always by saturated steam and under high vacuum conditions, until the desired cooking and sterilization is achieved. During this time each container works as an independent closed small autoclave, surrounded and heated externally by the steam of the autoclave, at the desired temperature, during the desired time.

It is to be noted that, complete vacuumization, blanching, cooking and sterilizing are achieved in a continuous operation in the closed autoclave, under ideal high vacuum conditions, by saturated steam which enters into the containers themselves, through their openings, before they are closed, which closing in its turn is at last automatically accomplished by the heat or the momentarily increased heat of the steam, as hereinafter will be described in detail. Examples of various foodstuffs treated in containers conformably to the present method will be given hereafter.

The substantially complete removal of air and gases from the food or other products and their sterilization under a substantially complete vacuum almost absolute are essential features of the method. It has been found that the sterilization is effected in a relatively very short time and at relatively low temperatures compared to conventional methods, because of the high vacuum conditions or the evacuation and removal of substantially all the air and other gases. These low temperatures and the short time sterilization in a complete vacuum and absence of oxygen retain the high quality of the preserved food products and food juices. Moreover, any noxious alterations which might have occurred in the products because of the presence of oxygen, and also the internal corrosion of the cans are effectively avoided.

The important quantity of air normally retained within food products may be demonstrated by placing the food products, such as olives, whole fruit, or vegetables etc. in a transparent container containing water surrounding the food product. Now when the transparent container is highly evacuated, innumerable air bubbles will be seen emerging from the surfaces of the food product and passing upwards through water for a period sometimes lasting as long at 5 minutes or more until a substantially complete vacuum is attained.

The superior results obtained by the present method of preserving and sterilizing foods and other materials are scientifically explained in the following manner. Microbes, bacteria and spores normally contain in or on foodstuffs have great resistance to sterilization, when they are enveloped in or covered by a gaseous medium, such as air or other gases found or produced inside the fruits and vegetables by their vital metabolism, which protect them. They are thereby protected against the action of sterilizing steam whenever they are covered or enclosed in a layer of air. Consequently, since air and other gases, frequently abundant, are found in food and other materials, diluted as well as undiluted, and held inside the food materials in the form of more or less small bubbles or bodies, the microbes, bacteria and spores are covered and protected to an important extent by these bodies or bubbles as if by a shield. The protection afforded by the air and gas content of foods and containers accounts for the difficulty in killing the bacteria and spores and is the principal reason why high temperatures, and long time sterilization are necessarily used in conventional canning procedures.

It is known that surgical instruments are sterilized at 100° C. in boiling water in 20–30 minutes, while for such a sterilization by dry-heated air in a stove, temperatures higher than 150° C. are required for a period of some hours.

The steps of the process, including vacuumization of long duration under high vacuum conditions and the substantially integral and complete removal of air and other gases, causes the rapid killing of the bacteria and spores at a relatively low temperature, so that a completely sterile product is obtained. In fact, the product is surgically sterile as distinguished from the types of socalled "sterilization" referred to in connection with conventional canning procedures, it being generally known that many canned food products are not completely sterile and, in many instances, are preserved for only a year or so. On the other hand, the foods processed by the present invention are completely sterile and have at the same time a superior quality of freshness and natural appearance because of their sterilization at low temperatures in a very short time and in absence of oxygen. These results have been demonstrated repeatedly and confirmed by many tests and by microbiological examinations. Furthermore, no antibiotics or bactericides are used.

The container system, particularly useful for carrying out the improved method of preserving and sterilizing foods and other materials comprises a container provided at its upper end with an automatically controlled closure means including an apertured seat carried by the container, a closure element for the seat and an air-tight gasket member or packing of soft rubber-like material interposed between the seat and the closure element. In the operation of this constructon, the closure element is mounted in a position to leave the aperture open but is urged toward closed position by a spring or other means. The closure element is preferably held in open position by a solid fusible substance, such as a solder or other fusible material which is solid at ordinary temperatures, and fuses at a desired temperature, so that air and other gases may be withdrawn from the container through the aperture, and steam may flow through the aperture into the container after all the air and other gases have been evacuated, the above controlled valve structure being adapted to produce a sealed structure when the solid fusible material is fused thereby permitting the closure element to be released and to effect a hermetic seal by compressing the gasket on the seat.

The invention includes other features, objects and advantages which are described more in detail hereinafter in connection with the accompanying drawings and examples.

In the drawings:

FIG. 1 is a broken vertical sectional view through the upper portion of a tin plate container or can having a valve closure means shown in open position and constructed in accordance with the invention;

FIG. 1a is a vertical sectional view of an empty tin can shown with its elements expanded. The individual spring 11a has inturned points which engage under the seamed edge rim of the top;

FIG. 2 is a fragmentary vertical sectional view through the valve closure means shown in FIG. 1 with the closure in closed position;

FIG. 3 is a vertical sectional view of a valve closure cap of the type shown in FIGS. 1 and 2 provided with a soldering bead carried by its rim;

FIG. 4 is a vertical sectional view of a jar system shown with its elements expanded;

FIG. 5 is a broken vertical sectional view through the upper portion of a bottle provided with a valve closure system constructed in accordance with the invention;

FIG. 6 is a fragmentary view similar to that of FIG. 5 showing a modified form of valve construction for a bottle;

FIG. 7 is a perspective view showing a large basket the lid of which is provided with springs for pressing on the valve closing elements of the numerous containers in the basket;

FIG. 8 includes vertical sectional views of controlled valve devices having tubular closing elements pushed tightly into a socket on the container and closed by pressure;

FIG. 9 includes vertical sectional views of modified forms of valve devices of which the tubular closing elements are pushed directly into an opening of a container; and FIG. 10 is a vertical sectional view of means for pressing and closing containers provided with pressure-sealed valve devices.

In carrying out the method of the invention in connection for example with the construction shown in FIGS. 1 and 2, the container 1 is filled with a food product, or other product, to be processed in vacuum and sterilized to provide a sterile preserved product. The container 1 is provided with a top or lid 2 which is seamed or sealed to the body of the container after the container is filled with the food or other product. The lid is provided with a valve closure structure including a valve seating comprising an annular groove or depression 4 pressed into the top of the container leaving a central boss 5 extending above the level of the lid 2 and having a central aperture 3. A fusible substance 9 is placed or run hot into the annular groove 4, for example a soldering compound melting at the desired temperature according to the processing procedure as described hereinafter. The solder or other solid fusible substance 9 is preferably provided with a low point or points to provide at least a passage 10 for air or gas and steam. The valve arrangement includes a cup-shaped cap 6 provided with a rubber gasket lining 8. Initially, the rim of the cap 6 rests on the solid solder 9, except for the passage 10 left in the solder. Instead of providing for a passage in the upper portion of the solder 9, the lower edge of the cap 6 may be notched at one or more points to provide an equivalent passage or a soldering bead 9a carried by the rim of the closure cap of FIG. 3 has notches 10a for this purpose, this closure cap being destined to be placed in the groove 4, which then may not be provided with solder 9. In processing a number of containers, they may be, after being provided with individual springs as that shown at 11a (FIG. 1a), arranged on the shelves of removable whatnots, which are placed in the autoclave, or the containers may be placed in large baskets or carriers (FIG. 7) the lids 12 of which have springs 11, each of which bears on a corresponding valve element 6, when the basket lid is closed. In FIG. 1 the basket cover is shown at 12 carrying a bow type spring 11 engaging the top of the cap 6. Alternately the containers may be placed in these baskets in superposed tiers, the valve of the lower container being pressed down by the bottom of the container above, and the valve of the latter by the corresponding spring of the basket lid. Instead of springs the lids 12 may have electric heating buttons pressing and locally heating the valve closures to melt the fusible substance. Instead of springs on the lid the baskets may alternately have springs below the containers to provide them with an elastic upward tendency. In such case the electric heating buttons are fixed firmly on the lid of the basket. The filled containers may be processed individually and in succession.

As many such containers 1 as required, and prepared in the manner described above, are placed in an autoclave, the autoclave is closed and a high vacuum of about 10 mm. of mercury is produced therein by means of a suction or vacuum pump until all the air and gases in the containers and inside the food or other products contained therein is completely exhausted. In this operation all the air and gases in the containers and in the packed product are withdrawn through the apertures 3 and the passages 10 or 10a. After the air has been exhausted, which may take from 2 to 5 minutes, even more in certain cases, depending on the treated material and on the pumping equipment employed, steam may be admitted into the autoclave, or generated directly therein. The steam enters directly into the containers themselves through the passages 10 or 10a and apertures 3 and heats, sterilizes and cooks the food products in the containers. In this operation, the autoclave is heated to the desired temperature by the steam and the solder 9 is melted by the heat or the momentarily increased heat of the steam, so that the springs 11 can push the caps 6 down until the rubber gasket 8 in each instance is pressed tightly against the boss 5 to hermetically seal the aperture 3. The position of the cap 6 at this stage of the operation is shown in FIG. 2.

After completion of the treatment the production of steam is interrupted and the autoclave is opened without any danger that the solder, while still liquid, will run through the valves into the containers because of the seal effected by the rubber gaskets 8. After the autoclave is opened and the containers removed and cooled sufficiently, the solder solidifies and attaches the edge or skirt of the cap firmly to the sides of the annular groove 4.

The foregoing procedure produces an automatically soldered hermetic seal on a number of containers simultaneously with a practically absolute internal vacuum, that is, at least as high as can be obtained with the vacuum pump employed.

FIG. 3 shows the cap 6 carrying a ring of solder 9a provided with a passage or passages 10a, which may be used instead of providing the solder 9 in the groove 4.

FIG. 4 shows a container 1' in the form of a glass jar provided with an automatically controlled valve arrangement which operates in a manner somewhat similar to that described above for the container 1. FIG. 4 shows the jar as provided with an annular seating rim 13 extending around the upper portion of the jar just below its top rim or mouth. An annular gasket 14 of soft rubber is set on the seat 13. The lower rim of a glass lid 15 is adapted to rest on and seal with respect to the gasket 14 when the container is finally closed. The circular annular seat 13 is provided with an extension or prominence 16, while the lid 15 is provided with a corresponding prominence or extension 17.

In the use of the container 1', it is filled for example with the food product to be sterilized. After filling, a body of solid fusible material 18 is placed on the prominence 16 and the lid is set in place with the prominence 17 resting on the body of fusible material 18, which holds the lid away from the gasket 14 along the side adjacent to the body 18, thereby providing a free passageway to and from the interior of the container for the flow of air, while the container and food are being exhausted of air and gases. The lid 15 is held in place under the urging of a spring 19, the lower inturned ends of which engage under the seat 13.

When filled containers in the form of the container 1' are processed in the manner described above with respect to the container 1, the solid fusible material 18 will melt, or be melted at the appropriate temperature after the air has been exhausted from the container and the food product therein, and after steam has been admitted to sterilize and to cook the foods, as also to heat and melt the fusible material. When the block of solid fusible material 18 melts, it permits the lid 15 to engage the entire circumference of the gasket 14 to seal the container and its contents.

FIG. 5 shows a somewhat different type of automatically controlled valve arrangement applied to the upper lateral wall of a bottle 20 which is normally filled with the food, such as a fruit juice, or other material to be preserved and/or sterilized, capped in the usual way and then subjected to processing by the procedure described above. As illustrated, the wall of the bottle 20 is provided near the top with a hole 21, and the surface of the bottle surrounding the hole serves as the seat. The closure in this instance comprises a disc or body 22 of soft rubber-like material elastically urged toward the opening 21 and the seat by an elastic ring 23 surrounding the neck of the bottle and overlying the rubber disc or pad 22. Initially, the rubber disc or pad 22 is tilted and held away from its seat by a wedge-shaped body 24 of solid fusible material set under the lower portion of the valve closure 22, as shown in FIG. 5.

When the bottle 20 and its contents are processed in the manner described above with respect to the container 1, the air and gases contained in the bottle and the food product therein will flow out through the opening 21 and around the wedge-shaped block of solid fusible material 24. At the proper determined time in the procedure the fusible material 24 is heated to its fusion temperature and runs down the side of the bottle, permitting the elastic ring 23 to force the rubber gasket 22 to its seat over the opening 21.

FIG. 6 shows a modified construction with respect to the showing in FIG. 5 in that the closure 22' for the opening 21' in the wall of the bottle 20', is provided with a hard firm margin or cover 25 which may extend over the annular periphery of the closure 22' and completely cover the back which is engaged by the elastic ring 23'. The covering 25 may be of metal or other hard material to lend rigidity to the closure, except for the central front portion of rubber, which extends over the opening 21'.

In FIG. 6 the wall of the bottle is provided with a concave depression 26 in its outer surface below the opening 21', which is adapted to receive a spherically-shaped body or ball 27 of solid fusible material. The lower marginal portion 25 of the closure 22' initially rests on the ball of fusible material 27. In this construction the concave recess 26 retains the piece of solid fusible material better than the plain wall surface of the bottle as in FIG. 5. This recess 26 connects into a groove 28 extending downwardly in the outer surface of the wall of the bottle 20' and facilitates the downward escape of the fusible material when it is fused in the processing thereby abandoning the container.

While the valve or closure arrangement shown in FIGS. 5 and 6 has been described in connection with a bottle which is normally filled and capped, it is to be understood that this valve arrangement may be used in connection with other types of containers.

The solid fusible substance for any of the containers described above may be a wax or plastic or a metallic alloy easily fusible at the required low temperature. For example, alloys of lead, tin, bismuth and cadmium which are solid at ordinary temperatures may be used melting at various temperatures according to their proportional composition.

It is to be understood that different forms of containers may be used for the application of my method and the final automatic sealing, provided they include a controlled closure system in which the closure is maintained open during evacuation and other treatments, while the processing may be somewhat adapted according to the case, its basis however remaining the same. For such a function containers of the known types may be employed which may be closed by pressure exerted mechanically on their closures such as covers, caps and lids for jars, cans and bottles lined with an airtightly closing lining of soft rubber-like or plastic material, or closures of the known type called "crown" closures, provided that the above closures may be retained, in whatever manner, a little raised from their closing position, leaving thus a free passage for air and gases, from and to the interior of the containers, while when pressure is exerted upon them, by suitable mechanical means, with which the closed vacuum space is provided and which may be actuated by means external to the closed vacuumization space, the above closures, pushed downwardly occupy finally their hermetically closing positions.

According to my method, after integral and complete vacuumization and before their closing, the containers of this type, and their contents, may be submitted to various treatments, and especially, concerning foods, to a sterilization by steam entered into them as aforesaid.

It is easy to conceive and construct apparatus for completely vacuumizing, sterilizing and cooking, and finally mechanically closing the above closures in one moment. Furthermore, the apparatus may work in the known continuous lines, adapted to the case.

Many variations also may be conceived and realized of closures, which may be air-tightly closed by mechanical means, principally and more advantageously by pressure exerted on the closures of numerous containers simultaneously.

Moreover, my following new types of controlled valve closures which may be closed by pressure exerted on them, although, as it happens with all the aforesaid pressure-closed closures, cannot apparently realize the absolute security of my automatically sealed and soldered closures of FIGS. 1–7, however, these new pressure-closing closures, shown more or less diagrammatically in the FIGS. 8, 9 and 10 accomplish advantageously and satisfactorily the aforesaid functions in the application of my method.

In FIG. 8, the cover 31 of the tin can 31' has an opening the edge of which is turned inwardly to form a tube-like ring $d$, into which is introduced under frictional restrain and/or secured or cemented an annular body 32 of elastic rubber-like or plastic material having a hole therethrough into which is tightly introduced a tubular plug 33 of which the lower end 34 is open, while its upper end is closed and nail-heated and which has a side hole 35. This plug 33 is tightly introduced or tightly fits in the hole of the body 32 in such manner that the hole 35 remains out of the upper surface of the annular body, so that a free passage for air and gases is left through the holes at 34 and 35 from and to the interior of the container.

In the processing, according to my method, numerous containers provided with such controlled pressure-closed closure structures, and filled for example with foodstuffs are placed in a vacuumizing closed space and submitted therein to a long duration vacuumization, until an integral and complete vacuum is obtained in the containers and their contents, followed by the step of sterilizing and/or cooking effected by steam introduced into the containers themselves. After completion of the treatment follows the step of exerting pressure on the valve closures 33 of all the containers simultaneously, to close them, by pressing means, as for example those shown schematically in FIG. 10, in which the disc or plate $m$ is pushed down by the rod $n$, which in its turn is pushed down by means manipulated externally to the closed vacuumizing space. At the moment the pressure plate $m$ is pushed down and presses on the closure plugs 33 of containers 31, it forces them to enter fully into the annular bodies 32, achieving in this manner the hermetic closure of all the containers simultaneously.

In FIG. 8, $e$ is a small ring of solid or supple suitable substance, which at the sterilizing temperatures becomes soft and adherent, thereby when the closure body is fully driven into the annular body 32, the air-tightness between the closure plug 33 and the annular body 32 is effectively assured. This ring may be replaced by a badigeon of a suitable adherent filling paste.

In the FIG. 10 the containers are arranged in a tier. However, the vacuumizing space may comprise several superposed such tiers. The pressing plates $m$ in this case are fixed on the rod $n$ which traverses all the tiers and when it descends, it carries away all the pressing plates $m$ simultaneously. Below the containers 31, springs $z$ or bodies of rubber-like supple material $k$ may be placed. In this manner each container acquires an elastic upward tendency, thereby the full driving of all the closure bodies into the plugs, when pressed downwardly by the pressing plates $m$, becomes unfailing. Instead of such urging means placed below the containers, analogous means may be fixed upon the under surface of the plate $m$ in order to press on the corresponding closure body when the plate $m$ is pushed down.

Instead of the described means for vacuumizing space of FIG. 10, removable whatnots, provided with small wheels may be used; on their shelves are arranged the containers while a rod, analogous to the rod $n$ of FIG. 10, traverses the shelves and carries down pressing plates, analogous to the plate $m$, which are fixed on the rod. These whatnots are introduced into a quadrilateral autoclave or vacuumizing space having a lateral entrance. The rod is cut in two parts at a point above the upper plate $m$. When the whatnot is introduced into the autoclave the upper end of the under part of the rod comes into register with the lower end of the upper part of the rod which slides air-tightly in a hole of the upper wall of the autoclave and may be pushed down by means manipulated externally to the autoclave. Thereby it pushes down the lower part of the rod on which the pressing plates $m$ are fixed. Several such whatnots may be placed in a relatively large autoclave.

In an analogous manner filled containers provided with the aforementioned known pressure-closed closures, as covers, caps and lids are treated and closed in accordance with my method. Concerning the crown-type closures the pressing plates or discs $m$ are provided with a special means by which the closing of the crown closures is effected.

In FIG. 8, 36 and 38 show metallic compact closing plugs having in their lower part a fissure 37. View F shows the closure of view H applied to a bottle.

In FIG. 9, the annular body 32 is omitted and view C shows a closure plug 39 of suitable rubber-like or plastic material introduced directly in the opening d' of the tin cover 31. View D shows an analogous application of such a closure 40 to a bottle. View E shows the closing plug 39' provided with a metallic liner b covered externally with the rubber-like or plastic material c, this construction providing consistency.

It is to be understood that many variations may be conceived and realized concerning all the aforesaid types of controlled valve structures which are closed at the desired moment by mechanically exerted pressure upon them, the basic construction however remaining the same.

Variations may also exist to some extent in the process without departing from the basic procedure and the meaning of the invention and method. For example, after the integral and complete vacuumization, the closing of the containers may follow immediately, if desired, and thereafter the closed containers being removed from the vacuumizing space, may be sterilized conformably to the usual methods and by the usual means, but, regarding the substantially complete vacuum realized in the containers and their contents, the sterilization is effected at the aforesaid low temperatures and in a very short time. In this case the sterilizing steam is produced inside the closed containers by external heating from the liquid contained in them, or, in the case of dry-packed foods, from a very little body of water or other liquor, placed at the bottom of each container during its filling.

In another variation of the process, after the integral and complete vacuumization and before the closing of the containers, a gas, inert for example, may be introduced into the vacuumizing space and thereby into the containers.

The method of the invention is illustrated by the following specific examples.

Example I

A number of glass jars of the type called "Fenix" were packed with very lightly salted black raw olives without any liquid or other material. The olives were previously plunged into a solution of caustic soda to eliminate bitterness and then rinsed. They had no other pretreatment. The tin covers or lids, provided with the valve device retained open as shown in FIG. 1, were applied and gripped hermetically to the jars, with interposition of a rubber ring. The packed and covered jars, provided with their individual springs like 19 of FIG. 4 urging here their valve closures, were placed in an autoclave, provided in its bottom with a body of water for the production of steam, and the autoclave was afterwards air tightly closed. A high vacuum pump was connected to the autoclave by a valved connection. The autoclave was also provided with a mercurial vacuometer and a centigrade thermometer. The vacuometer was of known type in which suction was applied to elevate a column of mercury in a glass tube standing in a container of mercury open to atmosphere. A high vacuum was applied for a period of 4 minutes to completely withdraw the air from the autoclave, the containers and from the black olives packed therein. At the conclusion of the evacuation, the vacuometer read 75 cm. of mercury, the equivalent of an absolute pressure of 10 mm. of mercury, which corresponds to a very high vacuum almost absolute, if the tension of the water vapor in the autoclave at the ambient room temperature is taken into consideration. At this point the cock in the vacuum line between the pump and the autoclave was closed and the autoclave was heated to vaporize the water placed therein to produce steam. The steam produced in the autoclave entered the jars since the closures were held open by the body of solid fusible material. The heating to vaporize the water was continued until the thermometer adapted to the autoclave reached 84° C., at which point the heating was stopped and the autoclave was immediately opened and the jars were removed. The solid fusible material had been melted by the heat of the steam at about 78° C., thereby the closures were hermetically sealed as a result of their elastic urging and afterwards soldered by the fusible soldering compound, when cooled and resolidified.

While the olives were packed dry, there is now a little liquor present in the bottoms of the jars, a very small part of which was produced by steam condensation while its great part appeared progressively in the course of time by extraction of some liquid from the olives by the suction of the vacuum inside the containers.

The olives were preserved and packed in perfect condition. One of the above jars of black olives was given a microbiological examination some two and one-half years after being packed and processed in the manner described in this example and found to be completely sterile. No viable organisms were found in any sample taken from the jar, on any media, solid or liquid.

Example II

Brown olives naturally deprived of bitterness were packed dry in glass jars without any salt or other substances and without any previous treatment, and subjected to processing in the autoclave by the same procedure as that described above under Example I. In this processing the evacuation of air was continued for 4 minutes when a vacuum or absolute pressure of 10 mm. of mercury was attained. The autoclave was heated to a temperature of 82° C. and the heating was discontinued when the thermometer reached this temperature. Microbiological examination long after packing showed the brown olives to be absolutely sterile. No liquor appeared in these jars.

Example III

Whole apricots in their natural state were packed in glass jars in water made acid with 1.50% of citric acid. The filled jars with the covers arranged in the manner described in Example I were processed by the same procedure as described in detail in Example I. The evacuation was continued for 5 minutes, when a vacuum of 10 mm. of mercury was attained. Heating was stopped when the thermometer read 80° C., and the autoclave was immediately opened.

Long after the whole apricots were packed in this manner, the apricots in one of the jars was given a microbiological examination and found to be completely sterile.

Example IV

Apricot halves without pretreatment were packed dry in glass jars and processed in the manner described in Example I. In this instance the evacuation was continued for 5 minutes, when a vacuum of 10 mm. of mercury was attained. Heating to produce steam was stopped at 82° C. The sealed jars contained a little liquor or juice at the bottom, extracted by the suction of the vacuum. The apricots were perfectly preserved and sterile.

Example V

Grapes in their natural state and without any pretreatment were packed in glass jars in water plus 15% sugar to make the solution isotonic and processed by the same procedure as that described in Example I. In this instance the evacuation was continued for 5 minutes when a vacuum of 10 mm. of mercury was attained. The heating of the autoclave to produce steam was continued only until the thermometer of the autoclave read 79° C. The grapes were preserved in perfect condition. Microbiological examination of the grapes and syrup in one of the jars after the lapse of more than a year showed a completely sterile pack, and the grapes had the appearance and taste of natural freshly picked grapes.

Example VI

Peeled whole tomatoes and large size tomato pieces were packed in glass jars, in serum, or juice of the tomatoes, and processed by the procedure described in Example I. The evacuation was continued for about 5 minutes when a vacuum of 10 mm. of mercury was attained. Heating and steam production was stopped when the thermometer showed a temperature of 78° C. Sterile products were obtained.

The object of the evacuation over a considerable period of time, about 2 to 5 minutes, even more in certain cases, is to remove the air, and its free oxygen as also other gases found or produced into the tissues of the fruits and vegetables by their vital metabolism, from the food products, or other materials as completely as possible and ultimately attaining a substantially complete vacuum resulting in an effective sterilization, and/or cooking, made at low temperatures and during a very short time, as also in avoidance of noxious alterations of the foods and of internal corrosion of the cans caused by the oxygen. Preliminary tests had shown that in evacuating under high vacuum a transparent container packed with olives in water, it took about 5 minutes, with the pump used, to reach a vacuum of 10 mm. of mercury. During this period, small air bubbles were seen escaping from the surfaces of the olives into and up through the water during the entire 5 minutes, first abundantly and then diminishing progressively until few were visible at the end.

Several forms of automatically-sealing containers and closures have been illustrated and described, and each may be used for particular food or other products where its use is more appropriate or convenient than any of the others.

The improved method of the present invention for preserving foods has the following advantages:

(a) The complete exhaustion of air and gases from the filled containers and food simultaneously, the complete vacuum and the automatic sealing of the containers simultaneously following the completion of the treatment provide convenient and reliable procedures.

(b) Food products other than those included in the examples can be processed without any gravy or liquor, such as beef, pork, poultry, fish, lobsters and other crustaceans, effected without the necessity of entirely filling or compacting in the containers, fresh or dried fruits or vegetables and canned corn, without previous blanching in water, thus preserving their mineral salts and all nutritive contents. After complete evacuation of air the steam penetrates all open spaces around the food products in the containers, thereby ideal uniform heating, sterilizing and/or cooking begin everywhere immediately.

(c) The processing is simplified since all the operations, i.e., complete vacuumization, blanching by steam, sterilizing and/or cooking and at last automatic sealing and soldering, are carried out in a continuous manner, in the closed autoclave itself.

(d) Since sterilization is effected in a very short time and at relatively low temperatures with a very high vacuum, the quality of the preserved food is much superior in appearance, consistency, flavor and odor; meat products are not darkened in color and the vitamins are almost entirely retained.

(e) Volatile aromatic substances may be added to the water from which the steam is generated so that they are carried over by the steam into the containers to season and aromatize their contents.

(f) Since the air content of the containers and food products therein is completely exhausted, the contents do not deteriorate and the containers do not corrode internally. Furthermore, since vacuum conditions are used throughout the processing, there is no bulging of the containers during sterilization, dangerous for their tightness.

Instead of relying on steam for fusing the solid fusible material used for final sealing, other suitable means may be employed for this purpose at the appropriate time in the processing. Electrical or other types of localized heating elements may be employed. Some products which may be processed in this way in vacuum or in a gas under the desired pressure are: butter, oils, milk or egg powder, fresh, dried or preserved vegetables and olives, fruits, coffee, tea, tobacco, cigarettes and others. While the closures of the containers remain open, various treatments may be applied in whatever order and succession, as for example: complete vacuumization, introduction of a gas under the desired pressure, sterilization and/or cooking by steam or by dry-heating in an inert gas.

The process and system may be used for sterilizing bandages, ligatures and other surgical and medical materials. After dry preheating in the autoclave to prevent moistening of the material, the vacuum is formed, and sterilization is effected at the required temperature, the fusible solder being fused at last by the heat. Such sterilization is perfect, in view of the absence of any air.

In carrying out the process with containers of the type described, the solder will have been melted by heat and automatic hermetic sealing will be obtained. Since the solder must be melted at a certain stage of the procedure, and at a predetermined temperature, there is an assurance that perfect sterilization has been attained and that the required temperature has also been attained and even exceeded. There is thus an absolute guarantee that the material will remain aseptic for an unlimited time, even if the sealed and soldered container should be immersed in a contaminating liquid. Such a guarantee of sealing is always necessary and, in fact, essential for dressings and operating materials to be kept in transport vehicles, vessels and aircraft, carried on expeditions as well as for storage in stock and for the use of armed forces, whether land, naval or aerial, at peace or war.

It is to be understood that many alternatives can be used in regard to the dimensions, materials or forms of the containers without departing from the features of the invention, i.e. the closing and sealing automatically and hermetically, of a number of containers may be effected simultaneously or in series by other closure arrangements.

The containers may be provided with a controlled valve device constituted very advantageously by a valve seat at the upper end of each container and a valve closing element elastically urged towards said valve seat, with an airtightly closing gasket or packing of rubber-like material interposed between the valve seat and the valve element. During the processing of the containers in a closed zone, the valve closing element is retained raised and spaced from the valve seat and the aperture, so that space is provided for free passage from and to the interior of the container, by employing in a convenient manner and form some solid fusible material, solid at ordinary temperatures.

After completion of the processing of the food or other product, the fusible material is fused by application of heat, at least locally or by momentary increase of heat, thereby liberating the valve closing element to close the aperture, the body of the interposed rubber-like material being compressed between the valve seat and the valve element and assuring the immediate airtight obturation of the aperture, while the fusible material may act to fix or completely stick or solder the valve element around the valve seat, achieving in this manner a second complete solid seal of the valve device. The above valve device, because of its novel form, has the advantage of dispensing with any additional element fitted under the valve aperture to prevent the fusible material, when fused, from falling inside the containers, since it is in a plane lower than the higher raised valve seat and aperture and the aperture is sealed off by the gasket as soon as the solid fusible material is fused.

The containers to be used with this system can be of metal or any other suitable material, e.g., glass, stoneware, porcelain, plastics, having in the latter cases a metal lid or cover. The lid may also be of the same material as the container, equipped with a valve or sealing element as described, in which case solder is replaced by a suitable adhesive substance such as wax or a plastic compound which sticks the valve element and valve seat together. The entire mouth of the container surrounded by a valve seat may constitute the opening of the closure device, while the entire cover or lid constitutes the valve closing element.

What I claim is:

1. The method of simultaneously, automatically and hermetically closing and sealing filled containers in a vacuum in which the upper end of each container is provided with a controlled valve structure retained firmly open during the treatment of the containers and of their contents, said controlled valve structure including a valve seat provided with an aperture for the free passage of air and gases and a depression outside and adjacent to the valve seat, comprising the steps of placing a body of a fusible material which is solid at ordinary temperatures in said depression, applying a valve closure in the form of a cap containing a gasket of soft sealing material over the valve seat and the aperture while the fusible material is solid with the edge rim of the cap maintained raised by said solid fusible material so that the gasket is spaced from the aperture and valve seat and at least a portion of the rim of the cap is spaced from the solid fusible material and the valve seat to leave a passageway, elastically urging the cap toward the valve seat, placing the containers in a vacuumizing zone and therein applying a high vacuum and thereby exhausting the air and gases from the containers and their contents through said apertures and around the rims of the caps through said passageways, and thereafter applying heat, at least locally to fuse said fusible material thereby causing said valve closures to engage their respective seats as a result of said urging with the gaskets engaging and closing said apertures.

2. The method as claimed in claim 1, in which the aperture of each valve seat is in a portion of the valve seat elevated with respect to the bottom of the depression to prevent the fusible material, when fused, from falling inside the container.

3. The method of simultaneously, automatically and hermetically closing and sealing filled containers, as claimed in claim 1, in which the step of applying heat includes the introduction of steam into the vacuumizing zone after vacuumization of the containers in the said zone, which steam entering into the containers themselves through the aforesaid apertures sterilizes their contents, the heat of the steam causing the fusion of the bodies of fusible material, thereby effecting automatically the hermetic closing and sealing of the apertures of the containers.

4. The method of simultaneously, automatically and hermetically closing and sealing filled containers as claimed in claim 1, including the step of introducing a gas into said zone and into the containers therein following the evacuation thereof and prior to the application of heat to fuse the bodies of fusible material.

5. The method of simultaneously, automatically and hermetically closing and sealing filled containers, as claimed in claim 1, in which the containers are filled with foodstuffs, and introducing a gaseous medium into the vacuumizing zone and into the containers filled with foodstuffs through their apertures after the withdrawal of air and gases therefrom and prior to the step of applying heat, the step of applying heat including the heating of the gaseous medium in said zone to heat the containers therein and thereby to cook and sterilize their contents by dry heating, said heating also causing the fusion of all the bodies of fusible material resulting in the hermetic closing and sealing of the apertures of the containers.

6. The method of simultaneously, automatically and hermetically closing and sealing filled containers in which each container is provided with a top having an annular depression forming a boss raised with respect to the bottom of the depression, said boss constituting a valve seat and having an aperture in its upper surface, comprising the steps of placing a body of a fusible material in said depression, placing a valve closure in the form of a cap containing a gasket of soft sealing material over the boss and aperture while the fusible material is solid with the edge rim of the cap resting on and supported by said fusible material so that the gasket is spaced from the boss and the aperture and at least a portion of the rim of the cap is spaced from the solid fusible material to leave a passageway, elastically urging the cap toward the valve seat, placing the containers into a vacuumizing zone and subjecting the zone and the containers therein to a high vacuum and thereby exhausting the air and gases from the containers and inside their contents through the aperture thereof and around the rims of the caps through said passageways, applying heat at least locally to fuse said fusible material, thereby causing said rim to enter said fused fusible material as a result of said urging and said valve closure to engage its seat with the gasket engaging said boss and closing said aperture, removing the containers from the vacuumizing zone while said fusible material is still fused and thereafter permitting the cooling of the containers to solidify the fusible material in the depressions thereof, whereby the rim of the cap of each container top is sealed in the solidified fusible material in the depression with which it is associated.

7. The method as claimed in claim 6, in which the top of the container and the valve closure are made of metal and the fusible material is a fusible metallic soldering compound, whereby the rim of the cap for each container is soldered into the depression in the top of the container.

8. The method of simultaneously, automatically and hermetically closing filled containers in a vacuum in which each container is provided in its upper end with a mouth surrounded by a valve seating surface and a depression outside and adjacent to said surface, comprising the steps of placing a body of a fusible material which is solid at ordinary temperatures in said depression, applying a valve closure in the form of a lid incorporating a gasket of soft sealing material over the mouth and the valve seating surface of each container while the fusible material is solid with the lid maintained slightly raised the solid fusible material so that the gasket is spaced from the seating surface and at least a portion of the rim of the lid is spaced from the solid fusible material to leave a passageway, elastically urging the closure lid of each container toward the valve seat, introducing the group of filled containers with their applied lids into a vacuumizing zone and therein subjecting the containers to a high vacuum by which the air and gases are completely withdrawn from the containers and from inside their contents through the mouths thereof and around their respective closures through the space between the gasket and seating surface and said passageway, and thereafter applying heat, at least locally, to fuse said body of fusible material thereby permitting the valve closures to move down and to engage their respective seats as a result of said urging the gaskets being compressed between their respective seating surfaces and the urged closures, to close hermetically the mouths of the containers.

9. The method of automatically and hermetically closing and sealing containers filled with products to be preserved, in which the upper portion of each filled container is provided with a controlled valve structure retained firmly open during the treatment of the contents, said controlled valve having a closure seat surrounding an opening, comprising the steps of placing a body of a fusible material which is solid at ordinary temperatures outside and adjacent said seat, applying a closure for said opening and a gasket of soft sealing material for the closure seat over the closure seat and opening while the fusible material is solid, with the closure maintained firmly raised and spaced from the seat and the opening by said solid fusible material so that the gasket is uncompressed and that a free passageway is left for the flow of gases from and to the interior of the container through the opening, elastically urging the closure towards the valve seat, evacuating the air and gases from the containers and inside the materials therein under very high vacuum conditions, the evacuating being prolonged until air and gases in the containers and inside the contained materials are completely exhausted, and thereafter applying heat, at least locally, to fuse the fusible material, effecting so the release of the closure, thereby permitting said closure to compress the gasket and seal off the opening as a result of said urging.

10. In a container provided with a controlled valve device composed of a hole through the lateral wall in the upper end of the container, the external surface of which, surrounding the hole, constitutes a seating surface, a valve closure for said hole comprising a gasket of soft sealing material, means for elastically urging the closure towards the hole and seating surface, and a body of fusible material solid at ordinary temperatures interposed between said valve closure and said seating surface and retaining the valve closure spaced from the seating surface and the open hole, leaving thus a free passageway for gases from and to the interior of the container, the valve closure and gasket in cooperation with the valve seating surface being adapted to produce a sealed structure when the solid fusible material is fused and the valve closure is liberated and urged towards the valve seating surface to compress the gasket against the valve seating surface and cover the hole.

11. A container as claimed in claim 10, in which the urging means is a ring of elastic material encircling the container.

12. The method of automatically and hermetically closing and sealing containers filled with food to be preserved and sterilized after complete and integral evacuation of the contained air and gases, in which the upper portion of each filled container is provided with a controlled valve retained firmly open during the treatment of the containers and of their contents, said controlled valve including a valve seat structure surrounding an opening, comprising the steps of placing a body of fusible material which is solid at ordinary temperatures outside and adjacent said seat, applying a closure for said opening and a gasket of soft sealing material for the closure seat over the closure seat and the opening while the fusible material is solid, with the closure maintained firmly raised and spaced from the seat and the opening by said solid fusible material, so that the gasket is uncompressed and that a free passageway is left for the flow of gases from and to the interior of each container through the opening, elastically urging the closure towards the valve seat, placing the containers in a hermetically closed space and then evacuating the air and gases from all the containers simultaneously and inside the food therein under high vacuum conditions until the air and gases in the containers and inside the contained food are completely exhausted, in order to form in the containers a substantially complete and integral vacuum, thereafter introducing saturated steam into the closed space and into the containers themselves, through their openings, to sterilize their content of food, thereafter sealing off all the containers simultaneously by the heat of the steam which causes the simultaneous fusion of said solid fusible material of all of the containers whereby the valve closures engage the corresponding valve seats and compress the gaskets to seal off the openings.

13. The method as claimed in claim 12, in which the containers therein and the food contained therein are subjected to high vacuum conditions in the closed space for a period of from two to five minutes.

14. A container adapted to serve as the means for packaging food and other materials to be preserved under high and complete vacuum conditions and to be hermetically sealed under said conditions, said container being provided on its top with a controlled valve structure composed of an annular depression surrounding a raised boss, said boss constituting the valve seat and having in its upper surface, a small vent hole permitting the passage of gases from and to the interior of the container, a valve closure for said valve seat including a cap lined with a sealing gasket and having a rim carrying a downwardly extending ring of solid fusible material, said ring being notched to provide passages for the free flow of gases from and to the interior of the container when said valve closure is placed over the valve seat and vent hole and the ring enters in the annular depression, so that the gasket is uncompressed and spaced from the boss and the vent hole and a free passageway is formed through the vent hole of the valve seat, and through the passages in the ring of fusible material, and means for elastically urging the valve whereby the valve closure and gasket in cooperation with the surface of the valve seat being adapted to produce a sealed structure when the solid fusible material is fused and the valve closure sinks into the fusible material to compress the gasket against the surface of the valve seat and covers and seals the vent hole.

15. A container for packaging food and other materials to be preserved and adapted to be sealed under high vacuum conditions in a closed evacuated space, said container being provided with a controlled valve structure including an aperture on the top of the container the external surface of which surrounding the aperture constitutes a valve seating surface, a valve closure for said aperture having the form of a plug which slides under frictional restraint in the aperture, said plug being provided with a passageway therein opening out into the container and through the side of the plug intermediate its ends, said passageway leaving free flow to the gases from and to the interior of the container during the time the plug is retained in unsealed position by the above frictional restraint with the passageway through the side of the plug open to the space outside the container plug is driven down in the aperture of the valve seat and thus the opening on the side of the plug, which was retained free and open above the surface of the valve seat, goes down beyond said surface the communication through the passageway is interrupted and the container is hermetically closed.

16. A container as claimed in claim 15, in which the plug includes an annular projecting flange at the top, and a soft adherent sealing member under the surface of said flange adapted to engage the seating surface of the container when the plug is pressed into the opening in the container.

17. A container as claimed in claim 15, including an annular body of compressible material fitted in the opening in the container and into which the plug extends.

18. In a container for packaging food and other materials to be preserved and adapted to be sealed under vacuum conditions, said container being provided with a valve structure including an opening in the upper portion of the container the external surface of which surrounding the opening constitutes a seating surface, the valve structure also including a valve closure for said opening carrying soft sealing material for engaging said seating surface, means for temporarily retaining the valve closure in a position spaced from the seating surface, the valve closure device when in said position cooperating with the opening and seating surface to provide a free passageway for the flow of gases from and to the interior of the container, the valve closure being adapted to produce a sealed structure when it is moved from said position to a position in which the soft sealing material thereof is in engagement with said seating surface and closes the free passageway from the opening.

19. A container as claimed in claim 18 in which the valve structure includes an annular depression surrounding the seating surface, and in which the means for temporarily retaining the valve closure in a position spaced from the seating surface comprises a body of solid fusible material located in the annular depression, said body of solid fusible material being solid at ordinary temperatures, said valve closure comprising a cap having a rim resting on the solid fusible material, and said soft sealing material being located in said cap.

References Cited in the file of this patent

UNITED STATES PATENTS

| | | |
|---|---|---|
| 1,888,133 | Kronquest | Nov. 15, 1932 |
| 1,931,911 | White | Oct. 24, 1933 |
| 1,975,012 | McKinnis | Sept. 25, 1934 |
| 2,092,445 | Doulgheridis | Sept. 7, 1937 |
| 2,168,506 | Ayers et al. | Aug. 8, 1939 |
| 2,239,008 | Loetscher | Apr. 22, 1941 |

FOREIGN PATENTS

| | | |
|---|---|---|
| 42,019 | Sweden | Feb. 7, 1917 |
| 28,874 | Norway | June 17, 1918 |